US009460204B2

(12) United States Patent
Larsen et al.

(10) Patent No.: US 9,460,204 B2
(45) Date of Patent: Oct. 4, 2016

(54) APPARATUS AND METHOD FOR SCENE CHANGE DETECTION-BASED TRIGGER FOR AUDIO FINGERPRINTING ANALYSIS

(71) Applicant: SONY CORPORATION, Tokyo (JP)

(72) Inventors: Tonni Larsen, Escondido, CA (US); Thomas Dawson, Escondido, CA (US)

(73) Assignee: SONY CORPORATION, Tokyo (JP)

( * ) Notice: Subject to any disclaimer, the term of this patent is extended or adjusted under 35 U.S.C. 154(b) by 427 days.

(21) Appl. No.: 13/656,152

(22) Filed: Oct. 19, 2012

(65) Prior Publication Data

US 2014/0114455 A1 Apr. 24, 2014

(51) Int. Cl.
G06F 17/00 (2006.01)
G06F 17/30 (2006.01)
H04H 60/58 (2008.01)
H04H 60/37 (2008.01)

(52) U.S. Cl.
CPC ...... *G06F 17/30787* (2013.01); *H04H 60/375* (2013.01); *H04H 60/377* (2013.01); *H04H 60/58* (2013.01)

(58) Field of Classification Search
CPC .......... G06F 17/30787; H04H 60/375; H04H 60/377; H04H 60/58
USPC ........................................................ 700/94
See application file for complete search history.

(56) References Cited

U.S. PATENT DOCUMENTS

| | | | |
|---|---|---|---|
| 5,918,223 A * | 6/1999 | Blum et al. | |
| 6,993,535 B2 * | 1/2006 | Bolle et al. | |
| 7,865,368 B2 * | 1/2011 | Li-Chun Wang et al. | 704/273 |
| 7,907,211 B2 | 3/2011 | Oostveen et al. | |
| 8,291,095 B2 * | 10/2012 | Cobb et al. | 709/229 |
| 2004/0260682 A1 * | 12/2004 | Herley et al. | 707/3 |
| 2005/0229204 A1 * | 10/2005 | Kalker | 725/19 |
| 2006/0187358 A1 * | 8/2006 | Lienhart et al. | 348/661 |
| 2007/0050341 A1 * | 3/2007 | Hull et al. | 707/3 |
| 2007/0118910 A1 | 5/2007 | Taylor | |
| 2008/0002854 A1 * | 1/2008 | Tehranchi et al. | 382/100 |
| 2009/0123025 A1 * | 5/2009 | Deng et al. | 382/100 |
| 2009/0154816 A1 * | 6/2009 | Swazey et al. | 382/232 |
| 2010/0158358 A1 * | 6/2010 | Lienhart et al. | 382/162 |
| 2011/0063317 A1 | 3/2011 | Gharaat | |

(Continued)

OTHER PUBLICATIONS

Robust Scene Change Detection Method; Huang; c2001.*

(Continued)

*Primary Examiner* — Paul McCord
(74) *Attorney, Agent, or Firm* — Chip Law Group (57) ABSTRACT

Certain aspects of an apparatus and method for scene change detection-based trigger for audio fingerprinting analysis may include a content-rendering device communicably coupled to a content-server. The content-rendering device may sample an audio component of the content at a sampling rate. The content-rendering device may generate and communicate to the content-server, an audio fingerprint based on the sampled audio component. The content-rendering device may further modify the sampling rate based on a detected scene change in the content. The scene change may be detected based on the communicated audio fingerprint. In another embodiment, the content-server may receive a plurality of audio fingerprints and detect a change in a type of content associated with the plurality of audio fingerprints. The content-server may further communicate a trigger signal to the content-rendering device that indicates the detected change in the type of content associated with the plurality of audio fingerprints.

14 Claims, 6 Drawing Sheets

(56) References Cited

U.S. PATENT DOCUMENTS

| | | | |
|---|---|---|---|
| 2011/0161076 A1* | 6/2011 | Davis et al. | 704/231 |
| 2011/0264455 A1* | 10/2011 | Nelson et al. | 704/500 |
| 2012/0059495 A1* | 3/2012 | Weiss | G06F 17/30743 700/94 |
| 2012/0095958 A1* | 4/2012 | Pereira et al. | 707/609 |
| 2012/0100915 A1* | 4/2012 | Margalit et al. | 463/31 |
| 2012/0271823 A1* | 10/2012 | Asikainen | G06F 17/30743 707/736 |
| 2013/0042262 A1* | 2/2013 | Riethmueller | 725/14 |
| 2013/0150117 A1* | 6/2013 | Rodriguez et al. | 455/550.1 |
| 2013/0160038 A1* | 6/2013 | Slaney et al. | 725/14 |
| 2013/0326082 A1* | 12/2013 | Stokking et al. | 709/231 |
| 2014/0075469 A1* | 3/2014 | Zhao | 725/32 |
| 2014/0357312 A1* | 12/2014 | Davis et al. | 455/550.1 |
| 2015/0032239 A1* | 1/2015 | Neuhauser | G10L 19/018 700/94 |

OTHER PUBLICATIONS

Office Action received for Chinese Patent Application No. 201310480397.4, mailed Jul. 28, 2016, 21 pages of Office Action including 8 pages of English translation.

* cited by examiner

APPARATUS AND METHOD FOR SCENE CHANGE DETECTION-BASED TRIGGER FOR AUDIO FINGERPRINTING ANALYSIS

CROSS-REFERENCE TO RELATED APPLICATIONS/INCORPORATION BY REFERENCE

None.

FIELD

Certain embodiments of the disclosure relate to fingerprinting analysis. More specifically, certain embodiments of the disclosure relate to scene change detection-based trigger for audio fingerprinting analysis.

BACKGROUND

Content-based interaction with consumers is a major advancement in the area of promotion and marketing. A consumer watching content may be assessed with respect to his/her interest in the displayed content. Providing additional information associated with the content to the viewer is a value addition to the displayed content. Fingerprinting is one of the several ways to track the content displayed on a user terminal.

Further limitations and disadvantages of conventional and traditional approaches will become apparent to one of skill in the art, through comparison of such systems with some aspects of the present disclosure as set forth in the remainder of the present application with reference to the drawings.

SUMMARY

An apparatus and/or method is provided for scene change detection-based trigger for audio fingerprinting analysis substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain implementations may be found in an apparatus and/or method for scene change detection-based trigger for audio fingerprinting analysis. The disclosed embodiments are best understood with reference to the figures and detailed description set forth herein. Various embodiments are discussed below with reference to the figures. However, those skilled in the art will readily appreciate that the detailed description given herein with respect to these figures is just for explanatory purposes, as the disclosed methods and apparatus may extend beyond the described embodiments.

The present disclosure relates to a method and system for identifying the commercial content rendered on a content-rendering device. Commercial content may be identified by audio fingerprints that may be generated in real time for the sampled audio component of the content displayed to the user. These audio fingerprints may be compared at the content-server to identify the type of the content viewed by the user. If the content-server identifies a user viewing commercial content, the server will transmit promotions or offers related to the commercial content to the content-rendering device.

Certain embodiments of the disclosure may be found in a system and/or method for tracking content rendered on a content-rendering device. Exemplary aspects of the disclosure may comprise a content-rendering device communicably coupled to a content-server. The content-rendering device may sample an audio component of the content at a sampling rate. The content-rendering device may further generate and communicate to the content-server, an audio fingerprint based on the sampled audio component. The content-rendering device may further modify the sampling rate based on a received trigger signal in response to a detected scene change in the content. The scene change may indicate a change in type of content. The type of content comprises commercial and non-commercial content. The content-rendering device may modify the sampling rate when the type of content changes from non-commercial content to commercial content. The content-rendering device may receive promotional content associated with the commercial content from the content-server. The content-rendering device may further display the promotional content as an overlay to the commercial content. The content-rendering device may modify the sampling rate when the type of content changes from commercial content to non-commercial content.

Certain embodiments of the disclosure may be found in a system and/or method for tracking content rendered on a content-rendering device. Exemplary aspects of the disclosure may comprise a content-server communicably coupled to a content-rendering device. The content-server may receive a plurality of audio fingerprints. The plurality of audio fingerprints may be associated with the content being rendered at the content-rendering device at corresponding sampling instances. The content-server may detect a change in a type of content associated with the plurality of audio fingerprints. The content-server may further communicate a trigger signal to the content-rendering device. The trigger signal indicates the detected change in the type of content associated with the plurality of audio fingerprints. The type of content comprises commercial and non-commercial content. The content-server may detect the change in the type of content based on comparing the plurality of received audio fingerprints with one or more pre-stored clusters. The pre-stored clusters comprises one or more audio fingerprints.

The content-server may communicate promotional content to the content-rendering device when the detected change in the type of content may be associated with commercial content.

Figure 1:
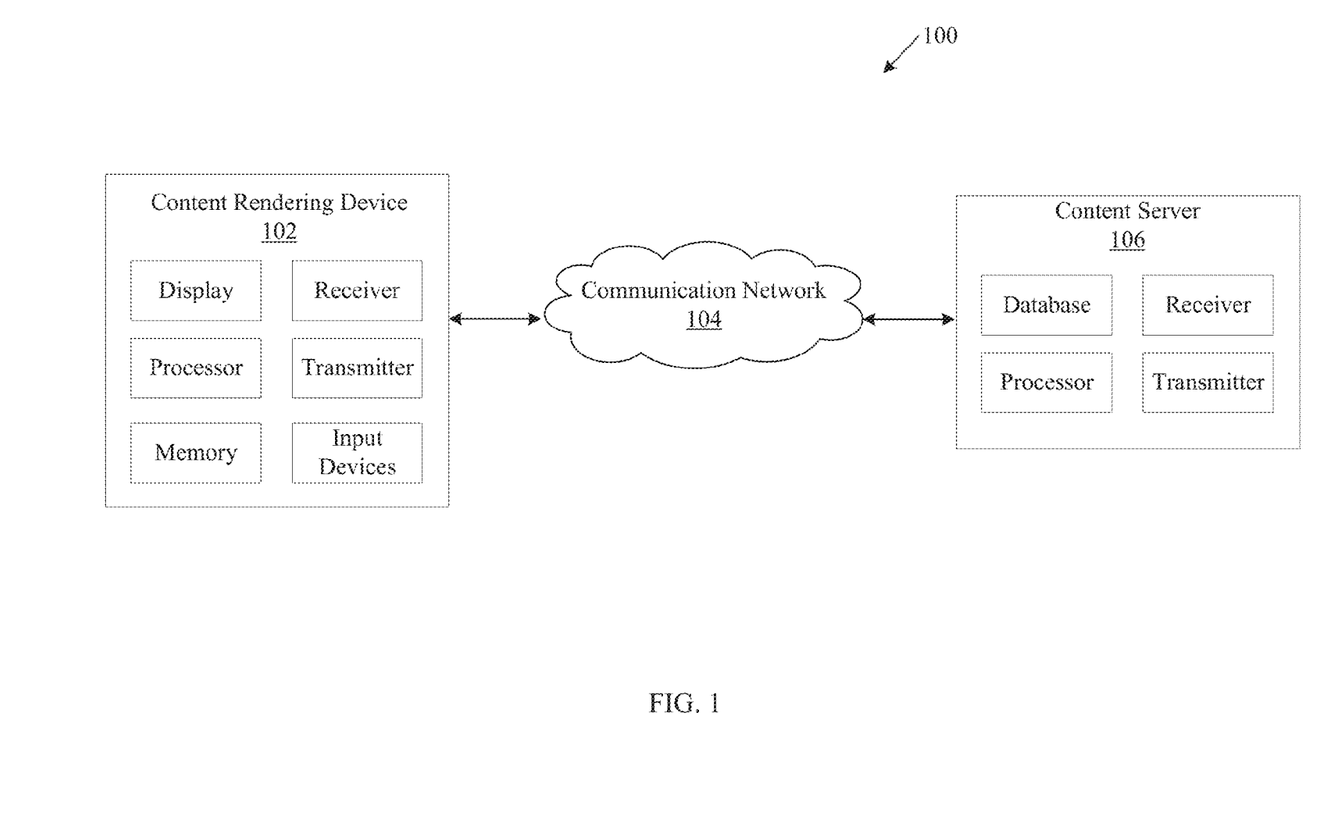
FIG. 1 is a block diagram illustrating a system environment in which the present disclosure may be implemented, in accordance with an embodiment of the disclosure.

FIG. 1 is a block diagram illustrating a system environment 100 in which the present disclosure may be implemented, in accordance with an embodiment of the disclosure. Referring to FIG. 1, there is shown the system environment 100 comprising a content-rendering device 102, a communication network 104, and a content-server 106. The content-rendering device 102 and the content-server 106 are communicably coupled via the communication network 104.

The content-rendering device 102 may correspond to an electronic device capable of displaying information, such as video and/or audio-visual content. The content-rendering device 102 may include a computing device that produces, streams or downloads information to be displayed, and a display screen or a projection surface that displays the information. In an embodiment, the display device includes the display screen and the computing unit integrated as a single unit. In another embodiment, the display device includes the computing device and the display screen as separate units. Examples of the display device include, but are not limited to, laptops, televisions (TV), tablet computers, desktop computers, mobile phones, gaming devices, and other such devices that have display capabilities.

The communication network 104 corresponds to a medium through which various components of the system environment 100 communicate with each other. Examples of the communication network 104 may include, but are not limited to, a television broadcasting system, an Internet Protocol television (IPTV) network, the Internet, a Wireless Fidelity (Wi-Fi) network, a Wireless Area Network (WAN), a Local Area Network (LAN), a telephone line (POTS), or a Metropolitan Area Network (MAN). Various devices in the system environment 100 can connect to the communication network 104, in accordance with various wired and wireless communication protocols, such as Transmission Control Protocol and Internet Protocol (TCP/IP), User Datagram Protocol (UDP), 2G, 3G, or 4G communication protocols. Further, communication network 104 may connect to the one or more content-rendering devices (similar to 102) and the one or more content-servers (similar to 106).

The content-server 106 may correspond to an electronic device to perform computation, comprising at least one database and at least one processor.

The content-rendering device 102 may display content to a user. The contents displayed on a content-rendering device 102 can be broadly classified into two categories—commercial content and non-commercial content. Commercial content includes content such as commercials and advertisements. Commercial content provides a means to generate additional revenue by presenting additional information to the user. Non-commercial content refers to content that does not generate additional revenue.

The audio component of the content displayed on the content-rendering device 102 may be sampled and an audio fingerprint may be generated corresponding to each sample by processing the sampled audio component using an algorithm. Audio fingerprints for audio samples within same commercial or non-commercial content may show correlation. The audio fingerprint may be transmitted to the content-server 106 via the communication network 104.

At the content-server 106, the received audio fingerprints may be compared with pre-stored cluster of audio fingerprints to find a correlated cluster corresponding to a particular commercial or non commercial content. The content-server 106 generates a trigger when subsequent received audio fingerprints correspond to different type of contents i.e. when an audio fingerprint corresponding to a non-commercial content may be followed by an audio fingerprint corresponding to a commercial content or vice versa. The trigger generated by the content-server 106 contains information about the required modification in the sampling rate at the content-rendering device 102. The trigger generated by the content-server 106 may be transmitted to the content-rendering device 102. Further, the content-server 106 may transmit promotional information corresponding to an identified advertisement to the content-rendering device 102.

Content-rendering device 102 may modify the sampling rate based on trigger signal received from the content-server 106. In one embodiment, the content-rendering device 102 samples the commercial content at a higher rate compared to non-commercial content. Content-rendering device 102 receives trigger signals from content-server 106 indicating the change in type of displayed content. In response to the trigger received, content-rendering device 102 may increase the sampling rate when the type of content displayed on the content-rendering device 102 changes from non-commercial content to commercial content and vice versa. In another embodiment, in response to the received trigger, the content-rendering device may pause the sampling for pre-defined time duration. In another embodiment, the content-rendering device 102 may sample at a customized rate by taking into consideration the duration of commercial and non-commercial contents.

Figure 2:
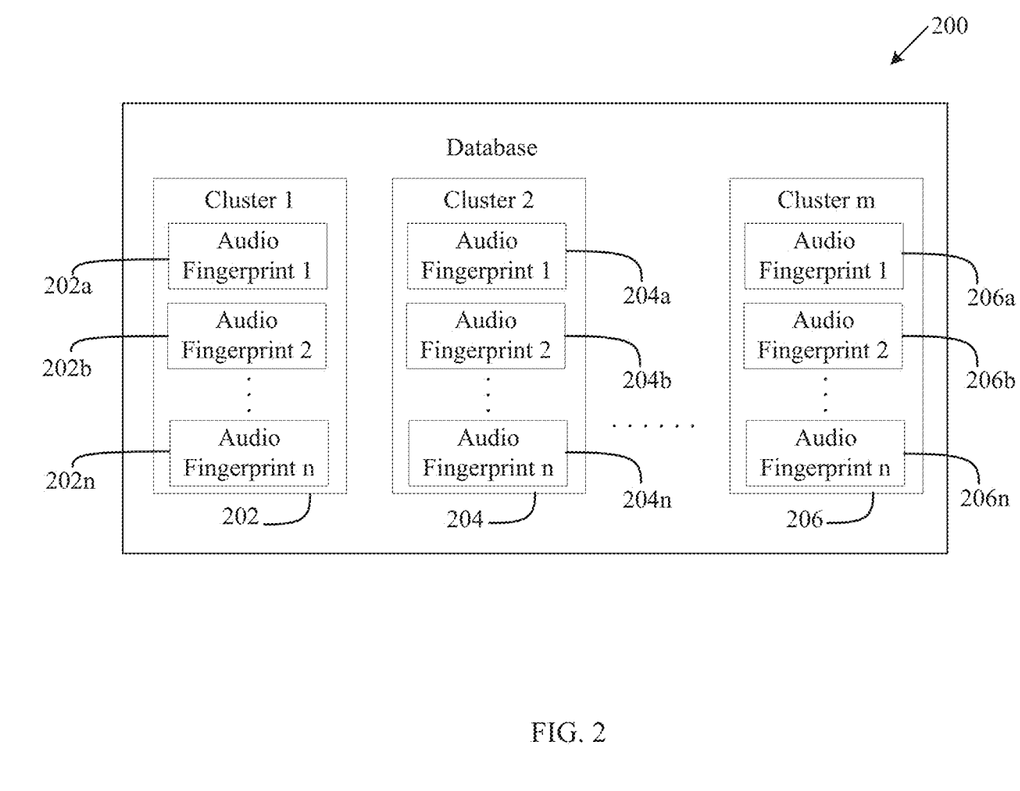
FIG. 2 is a block diagram illustrating a database in which audio fingerprints may be organized into clusters, in accordance with an embodiment of the disclosure.

FIG. 2 is a block diagram illustrating a database 200 in which audio fingerprints may be organized into clusters, in accordance with an embodiment of the disclosure. FIG. 2 is explained in conjunction with FIG. 1. The database 200 comprises audio fingerprints for the content rendered on the content-rendering device 102. In an embodiment, the audio fingerprints may be classified into clusters. A pre-stored cluster 202 comprises a plurality of audio fingerprints 202a-202n. A pre-stored cluster 204 comprises a plurality of audio fingerprints 204a-204n. A pre-stored cluster 206 comprises a plurality of audio fingerprints 206a-206n. The database 200 may include any number of pre-stored clusters (such as, 202, 204 and 206). The pre-stored cluster (202, for example) may correspond to a particular portion, type or group of content. In an embodiment, the audio fingerprints (such as, 202a-202n, 204a-204n, and 206a-206n) may be grouped into pre-stored clusters (such as, 202, 204 and 206) where each pre-stored cluster (202, for example) corresponds to a particular commercial or non-commercial content.

An audio fingerprint received from the content-rendering device 102 may be compared with the pre-stored clusters (such as, 202, 204 and 206) in the database 200 to find a pre-stored cluster (202, for example) with correlation exceeding a pre-determined threshold value. The content-server 106 can identify the content associated to the received audio fingerprint from the correlated pre-stored cluster (202, for example) in the database 200.

In another embodiment, the pre-stored clusters (such as, 202, 204 and 206) at the content-server 106 and the received audio fingerprint can be associated with metadata. The metadata associated with the pre-stored clusters (such as, 202, 204 and 206) of audio fingerprints give identifying information about the content to which the pre-stored clusters (such as, 202, 204 and 206) may be associated. Examples of such metadata may include, but are not limited to, a timestamp notification of playback time of the content on the content-rendering device 102, a type of content, a content identifier (id), and other identifying information associated with the content. For example, if the content is a video, the metadata associated with the video may include, but is not limited to, title of the video, type of video (commercial or non-commercial), duration of the video, probable playback time, tags related to the content of the video, and information about other similar videos.

The metadata associated with the received audio fingerprint may be used to improve the time duration for finding a pre-stored cluster (202, for example) in the database 200, in correlation to the received audio fingerprint. The metadata associated with the received audio fingerprint may be compared with the metadata of the pre-stored clusters (such as, 202, 204 and 206) in order to find a set of pre-stored clusters (such as, 202, 204 and 206) with matching metadata. Subsequently a comparison occurs between the received audio fingerprint and the set of pre-stored clusters (202 and/or 204, for example) with matching metadata. A pre-stored cluster (202, for example) with a correlation, exceeding a threshold value, to the received audio fingerprint may be found from the set of pre-stored clusters (202 and/or 204, for example) with matching metadata.

In another embodiment, the audio fingerprints may not be clustered and the database 200 comprises a collection of pre-stored audio fingerprints. The received audio fingerprint may be compared with the collection of pre-stored audio fingerprints in the database 200 to find a correlated pre-stored audio fingerprint, with correlation exceeding a predetermined threshold value. The content-server 106 can identify the content associated with the received audio fingerprint from the correlated pre-stored audio fingerprint in the database 200.

In another embodiment, the pre-stored audio fingerprints at the content-server 106 can be associated with the metadata. The metadata associated with the pre-stored audio fingerprints give identifying information about the content to which the pre-stored audio fingerprints may be associated. A pre-stored audio fingerprint with a correlation, exceeding a threshold value, to the received audio fingerprint may be found from the set of pre-stored audio fingerprints with matching metadata.

In an embodiment, the database 200 may be residing at a single content-server 106. In another embodiment, the database 200 may be distributed among one or more content-servers (such as content-server 106). The one or more content-servers (such as content-server 106) may connect to the content-rendering device 102 via the communication network 104.

Figure 3A:
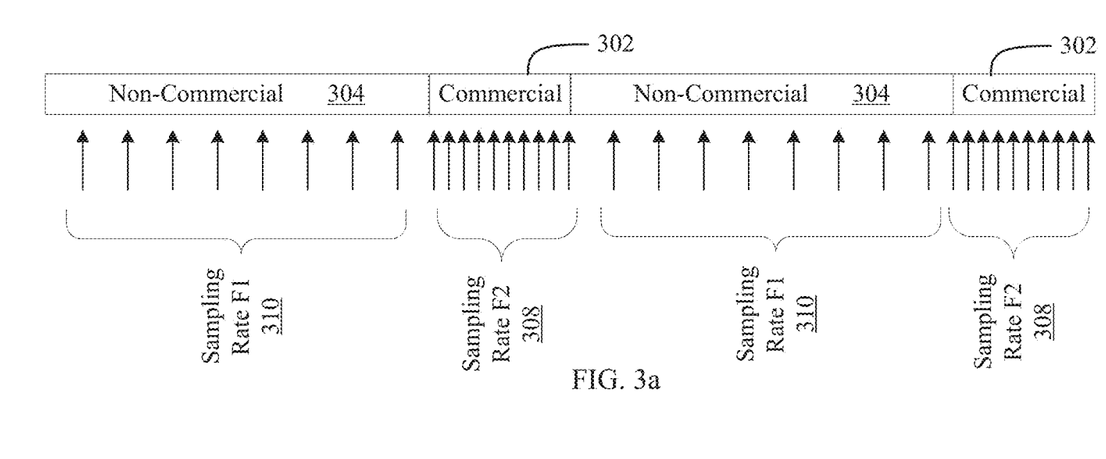
FIG. 3a illustrates a variation in sampling rate of the commercial and non-commercial content, in accordance with an embodiment of the disclosure.

FIG. 3a shows a pattern of sampling for commercial segment 302 and non-commercial segment 304 of the content displayed on the content-rendering device 102, in accordance with an embodiment of the disclosure. The pattern showed here uses different sampling rates for commercial segment 302 and non-commercial segment 304. The non-commercial content may be sampled at a lower rate compared to the commercial content. The sampling rate for the non-commercial segment 304 may be F1 (depicted as 310 in FIG. 3a) and that for the commercial segment 302 may be F2 (depicted as 308 in FIG. 3a). The content-rendering device 102 may initially sample the audio component of the content at rate F1. The processed audio component sample generates an audio fingerprint. The generated audio fingerprint is communicated to the content-server 106. The content server 106 may be operable to compare the audio fingerprint with pre-stored audio fingerprints. If it is determined that the audio fingerprint corresponds to commercial content, the content-server 106 may communicate a trigger signal to the content-rendering device 102 to sample at a different sampling rate. The sampling may continue at the new sampling rate throughout the segment of commercial content and the corresponding audio fingerprint is communicated to the content-server 106. The content-server 106 may analyze each audio fingerprint received from the content-rendering device 102. When the content-server 106 receives an audio fingerprint corresponding to a non-commercial segment 304 of the content, the content-server 106 may generate a trigger signal to the content-rendering device 102 to switch the sampling rate to F1.

Figure 3B:
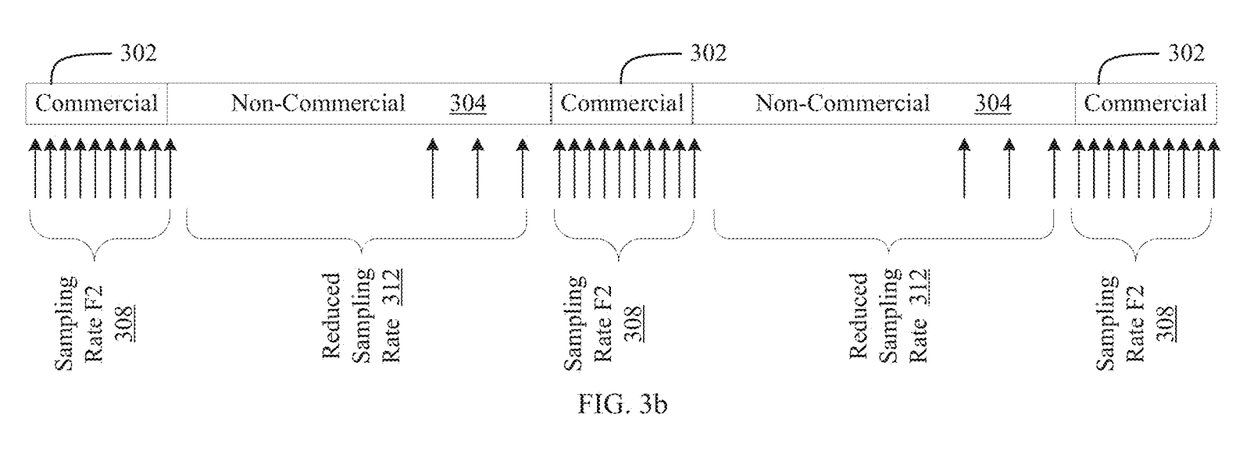
FIG. 3b illustrates another variation in sampling rate of the commercial and non-commercial content, in accordance with another embodiment of the disclosure.

FIG. 3b shows another pattern of sampling for commercial segment 302 and non-commercial segment 304 of the content displayed on content-rendering device 102, in accordance with an embodiment of the disclosure. The pattern shown here suspends the sampling for a pre-defined time (depicted as 312 in FIG. 3b) when the non-commercial segment 304 is identified. The content-rendering device 102 may be operable to sample the commercial segment 302 of the content and communicate the corresponding audio fingerprint to the content-server 106. The content-server 106 may analyze the received audio fingerprint in order to recognize the type of content. When the content-server 106 identifies the received audio fingerprint that corresponds to non-commercial content, the content-server 106 may communicate a trigger signal to the content-rendering device 102 to suspend the sampling for a predefined time (depicted as 312 in FIG. 3b). The time for which the sampling may be suspended may depend on the knowledge of the time window provided for the non-commercial content. The time for which the sampling may be suspended is less than the time window provided for the non-commercial content so that sampling begins before the content-rendering device 102 starts displaying the commercial segment 302. Further, when the content-server 106 receives an audio fingerprint that which corresponds to a commercial segment 302 of the content, the content-server 106 may communicate a trigger signal to the content-rendering device 102 to switch sampling rate to F2 (depicted as 308 in FIG. 3b).

Figure 3C:
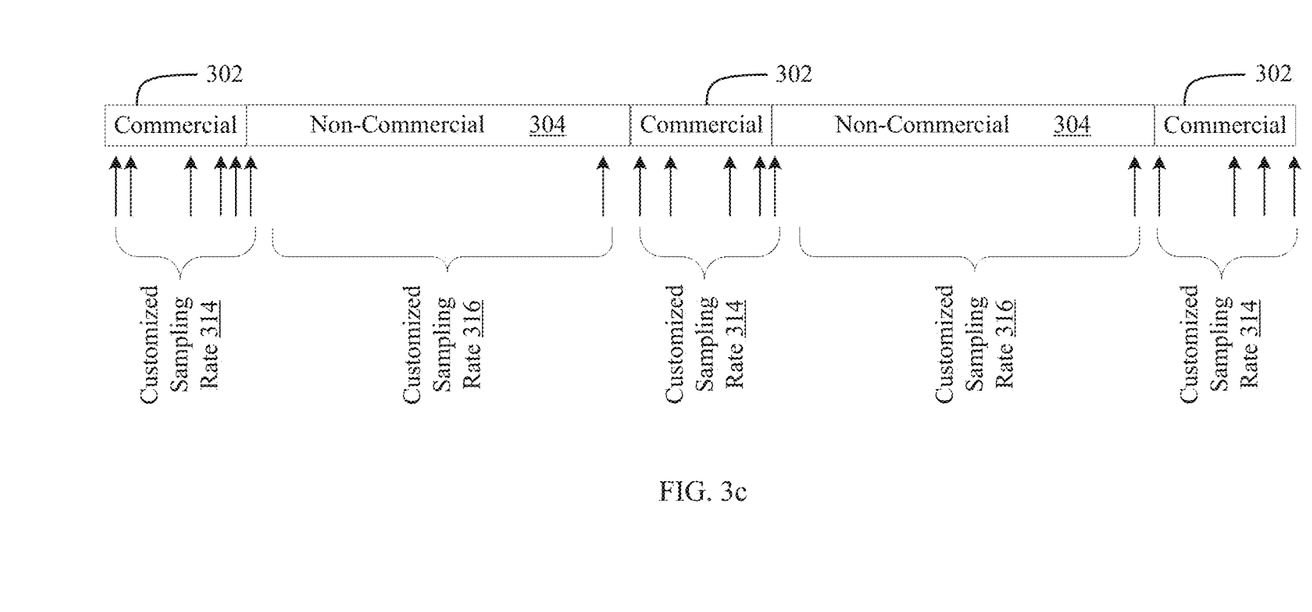
FIG. 3c illustrates an exemplary variation in sampling rate of the commercial and non-commercial content, in accordance with another embodiment of the disclosure.

FIG. 3c shows an exemplary pattern of sampling for commercial segment 302 and non-commercial segment 304 of the content displayed on content-rendering device 102, in accordance with another embodiment of the disclosure. The embodiment illustrates a method where the sampling occurs in a customized fashion by knowing the time duration of the identified commercial content within the commercial segment 302 or the time duration of the non-commercial segment 304. At the content-server 106, the commercial content within the commercial segment 302, or the non-commercial segment 304 may be identified using the audio fingerprint received from the content-rendering device 102. The content-server 106 guides the content-rendering device 102 to determine the time instances of sampling (depicted as 314 and 316 in FIG. 3c). The content-server 106 may index the time duration of each commercial content presented during the commercial segment 302, and the time duration of the non-commercial segment 304. When the content-server 106 identifies the non-commercial segment 304 or a commercial content during a commercial segment 302, the content-server 106 may determine the time duration of the commercial content or the non-commercial segment 304. Accordingly, the content-server 106 may communicate a trigger signal to the content-rendering device 102 to suspend the sampling for a time interval less than the duration of the identified commercial content or non-commercial segment 304.

In an embodiment, the content-server 106 identifies a commercial content displayed on the content-rendering device 102 and transmits promotions and offers associated with the identified commercial content to the content-rendering device 102. The content-rendering device 102 may present the promotions or offers received from the content-server 106 as an overlay to the displayed commercial content. In another embodiment, the user may be presented a menu with options to accept or reject the offers or discounts. In another embodiment, the overlay may remain visible for a consequent commercial or non-commercial content, where the consequent commercial or non-commercial content has no promotions or offers related to it. In another embodiment, additional information related to the identified commercial may be presented to the user.

In another embodiment, identification of commercial content may be used to determine the viewership of a particular content, which may be used to rate the content displayed on the content-rendering device 102.

Figure 4:
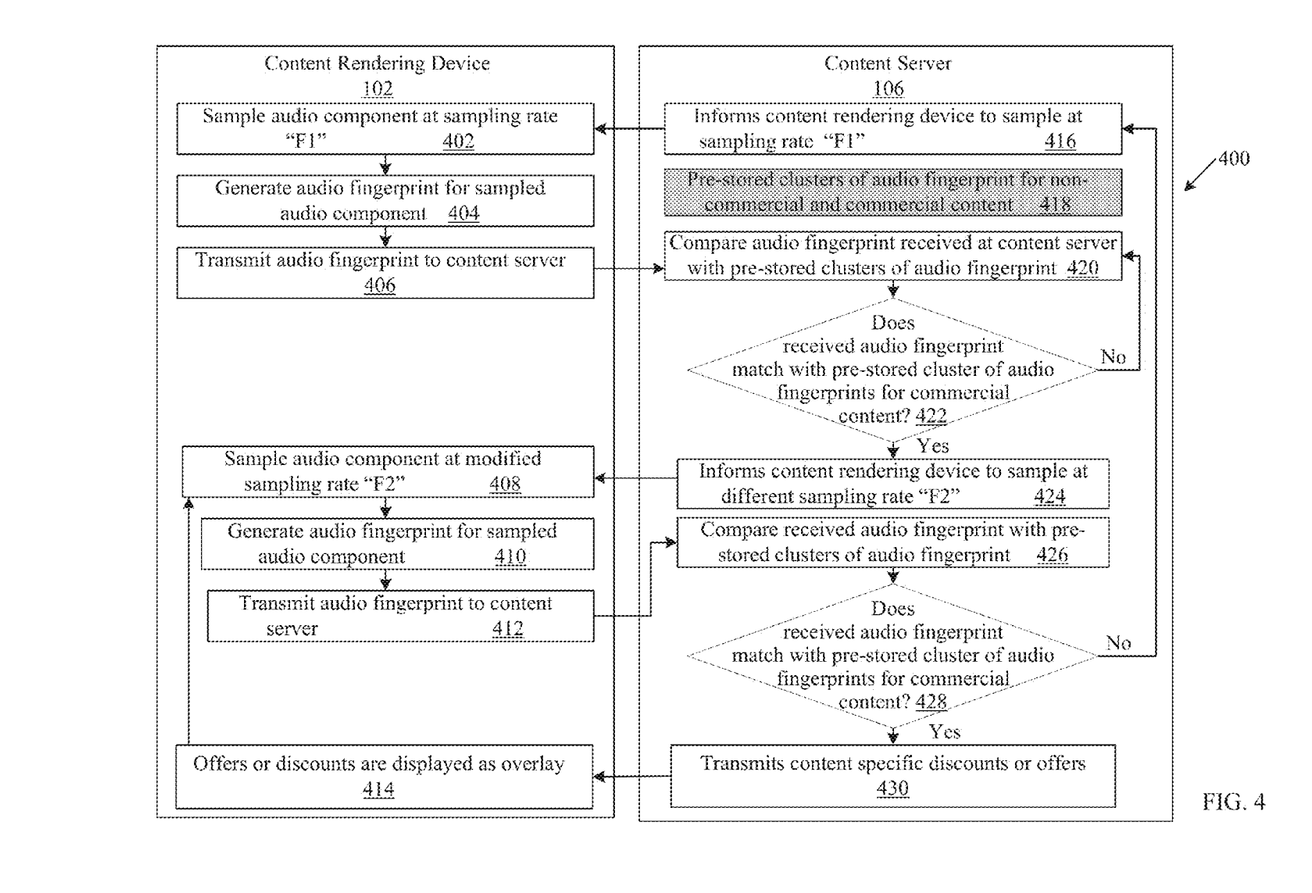
FIG. 4 is a flow diagram illustrating a method for varying the audio sampling rate, in accordance with an embodiment of the disclosure.

FIG. 4 is a flow diagram illustrating a computer-implemented method 400 for controlling the sampling rate at the content-rendering device 102 based on the audio fingerprint analysis at the content-server 106.

At step 402, the audio component of the content may be sampled at a sampling rate "F1" at the content-rendering device 102. At step 404, an audio fingerprint is generated from the sampled audio component using an algorithm. At step 406, the generated audio fingerprint is communicated to the content-server 106.

As shown in step 418, content-server 106 has pre-stored clusters (such as, 202, 204 and 206) of audio fingerprints (such as, 202a-202n, 204a-204n, and 206a-206n) for commercial content and non-commercial content. At step 420, the content-server 106 may compare the received audio fingerprint with the pre-stored cluster (202, for example) of audio fingerprints. At step 422, the content-server 106 may determine whether the received audio fingerprint matches with a pre-stored cluster (202, for example) of audio fingerprints for commercial content. In instances where the content-server 106 determines that the received audio fingerprint does not match with the pre-stored cluster (202, for example) for commercial content, then the method proceeds to step 420. In instances where the content-server 106 determines that the received audio fingerprint matches with the pre-stored cluster (202, for example) for commercial content, then the method proceeds to step 424. At step 424, the content-server 106 communicates a trigger signal to the content-rendering device 102 to sample at a different sampling rate "F2".

At step 408, the content-rendering device 102 may sample the content at a new sampling rate. At step 410, an audio fingerprint may be generated for the sampled audio component. At step 412, the generated audio fingerprint may be communicated to the content-server 106.

At step 426, the content-server 106 may compare the received audio fingerprint with the pre-stored cluster (202, for example) of audio fingerprints. At step 428, the content-server 106 may determine whether the received audio fingerprint matches with the pre-stored cluster (202, for example) of audio fingerprints for commercial content. In instances where the content-server 106 determines that the received audio fingerprint does not match with the pre-stored cluster (202, for example) for commercial content, then the process proceeds to step 416. At step 416, the content-server 106 may communicate a trigger signal to the content-rendering device 102 to sample at a different sampling rate "F1". The method then returns to step 402.

In instances where the content-server 106 determines that the received audio fingerprint matches with the pre-stored cluster (202, for example) for commercial content, the method proceeds to step 430. At step 430, the content-server 106 may identify the commercial content from the received audio fingerprint and communicate to the content-rendering device 102, one or more discounts or offers specific to the identified commercial content. At step 414, the content-rendering device 102 may receive information regarding the offers or discounts related to a particular commercial content and display it to the user. The method then returns to step 408.

Other embodiment of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising sampling an audio component of a content at a sampling rate, generating an audio fingerprint based on the sampled audio component, communicating the generated audio fingerprint to a content-server, and modifying the sampling rate based on a detected scene change in the content. The scene change is detected based on the communicated audio fingerprint.

In accordance with another embodiment, the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising receiving a plurality of audio fingerprints, detecting a change in a type of content associated with the plurality of audio fingerprints and communicating a trigger signal to the content-rendering device. The plurality of audio fingerprints is associated with the content being rendered at the content-rendering device at corresponding sampling instances. The trigger signal indicates the detected change in the type of content associated with the plurality of audio fingerprints.

In accordance with another embodiment of the disclosure, a method and system for tracking content rendered on a content-rendering device 102 (FIG. 1). The content-rendering device 102 communicably coupled to a content-server 106 (FIG. 1) comprises one or more processors and/or circuits. The content-rendering device 102 may sample an audio component of the content at a sampling rate. The content-rendering device 102 may further generate and communicate to the content-server 106, an audio fingerprint based on the sampled audio component. The content-rendering device 102 may further modify the sampling rate based on a detected scene change in the content. The content-rendering device 102 may modify the sampling rate when a type of content changes from a non-commercial content to a commercial content. The content-rendering device 102 may modify the sampling rate when a type of content changes from a commercial content to a non-commercial content. The content-rendering device 102 may receive promotional content associated with an identified commercial content from the content-server 106. The content-rendering device 106 may display the promotional content as an overlay to the identified commercial content.

In accordance with another embodiment, a method and system for tracking content rendered on a content-rendering device 102. The content-server 106 comprises one or more processors and/or circuits. The content-server 106 may receive a plurality of audio fingerprints, wherein the plurality of audio fingerprints may be associated with the content being rendered on the content-rendering device 102 at corresponding sampling instances. The content-server 106 may detect a change in a type of content associated with the plurality of audio fingerprints. The content-server 106 may further communicate a trigger signal to the content-rendering device 102, wherein the trigger signal indicates the detected change in the type of content associated with the plurality of audio fingerprints.

The content-server 106 may comprise one or more pre-stored clusters (such as, 202, 204 and 206), wherein the one or more pre-stored clusters (202, for example) comprise one or more audio fingerprints (202a-202n, for example). The content-server 106 may detect the change in the type of content, based on comparing the plurality of received audio fingerprints with the one or more pre-stored clusters (such as, 202, 204 and 206). The content-server 106 may communicate promotional content to the content-rendering device 102 when the detected change in the type of content may be associated with commercial content.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for tracking content rendered on a content-rendering device that is communicably coupled to a content-server, said method comprising:

sampling by said content-rendering device, a first audio component of said content at a sampling rate;

generating and communicating to said content-server, a first audio fingerprint based on said sampled first audio component;

suspending said sampling for a predetermined period of time based on detection of a scene change in said content;

modifying said sampling rate after said predetermined period of time based on said detected scene change in said content, wherein said scene change is detected based on said communicated first audio fingerprint;

generating and communicating to said content-server, a second audio fingerprint based on a second audio component of said content sampled at said modified sampling rate;

receiving promotional content based on said second audio fingerprint generated at said modified sampling rate; and displaying said promotional content as an overlay on said content when said content is a commercial content comprising at least an advertisement, wherein said promotional content is determined based on said commercial content.

2. The method of claim 1, wherein said scene change indicates a change in a type of content.

3. The method of claim 2, wherein said type of content comprises said commercial content and a non-commercial content.

4. The method of claim 3, comprising modifying said sampling rate when said type of content changes from said non-commercial content to said commercial content.

5. The method of claim 3, wherein said promotional content is associated with said commercial content.

6. The method of claim 3, comprising modifying said sampling rate when said type of content changes from said commercial content to said non-commercial content.

7. A method for tracking content rendered on a content-rendering device that is communicably coupled to a content-server, said method comprising:

receiving by said content-server, a first audio fingerprint sampled at a first sampling rate, wherein said first audio fingerprint is associated with said content being rendered at said content-rendering device at a first sampling instance;

detecting a change in a type of content based on a comparison of said first audio fingerprint with a pre-stored cluster of audio fingerprints for commercial content and for non-commercial content;

communicating a trigger signal to said content-rendering device, wherein said trigger signal indicates said detected change in said type of content associated with said first audio fingerprint, wherein said trigger signal instructs said content-rendering device to suspend sampling of said content being rendered at said content-rendering device for a predetermined period of time and to modify said first sampling rate of said content to a second sampling rate at said content-rendering device after said predetermined period of time;

receiving by said content-server, a second audio fingerprint sampled at said second sampling rate;

detecting whether said second audio fingerprint matches with said one or more pre-stored clusters for said commercial content;

identifying said commercial content based on said second audio fingerprint; and communicating promotional content specific to identified commercial content to said content-rendering device, wherein said promotional content is displayed as an overlay to said identified commercial content on said content-rendering device.

8. The method of claim 7, wherein said type of content comprises said commercial content and said non-commercial content.

9. An apparatus for tracking content rendered on a content-rendering device, said apparatus comprising:
one or more processors and/or circuits in said content-rendering device communicably coupled to a content-server, said one or more processors and/or circuits being operable to:
sample a first audio component of said content at a sampling rate;
generate and communicate to said content-server, a first audio fingerprint based on said sampled first audio component;
suspend said sampling for a predetermined period of time based on detection of a scene change in said content;
modify said sampling rate after said predetermined period of time based on said detected scene change in said content, wherein said scene change is detected based on said communicated first audio fingerprint;
generate and communicate to said content-server, a second audio fingerprint based on a second audio component of said content sampled at said modified sampling rate;
receive promotional content based on said second audio fingerprint generated at said modified sampling rate; and
display said promotional content as an overlay on said content when said content is a commercial content comprising at least an advertisement, wherein said promotional content is determined based on said commercial content.

10. The apparatus of claim 9, wherein
said one or more processors and/or circuits are operable to modify said sampling rate when a type of content changes from a non-commercial content to said commercial content.

11. The apparatus of claim 9, wherein
said one or more processors and/or circuits are operable to modify said sampling rate when a type of content changes from said commercial content to a non-commercial content.

12. The apparatus of claim 9, wherein
said one or more processors and/or circuits are operable to receive said promotional content is associated with said commercial content.

13. An apparatus for tracking content rendered on a content-rendering device, said apparatus comprising:
one or more processors and/or circuits in a content-server communicably coupled to said content-rendering device, said one or more processors and/or circuits being operable to:
receive a first audio fingerprint sampled at first sampling rate, wherein said first audio fingerprint is associated with said content being rendered at said content-rendering device at a first sampling instance;
detect a change in a type of content based on a comparison of said first audio fingerprint with a pre-stored cluster of audio fingerprints for commercial content and for non-commercial content;
communicate a trigger signal to said content-rendering device, wherein said trigger signal indicates said detected change in said type of content associated with said first audio fingerprint, wherein said trigger signal instructs said content-rendering device to suspend sampling of said content being rendered at said content-rendering device for a predetermined period of time and to modify said first sampling rate of said content to a second sampling rate at said content-rendering device after said predetermined period of time;
receive by said content-server, a second audio fingerprint sampled at said second sampling rate;
detect whether said second audio fingerprint matches with said one or more pre-stored clusters for said commercial content;
identify said commercial content based on said second audio fingerprint; and
communicate promotional content specific to identified commercial content to said content-rendering device, wherein said promotional content is displayed as an overlay to said identified commercial content on said content-rendering device.

14. The apparatus of claim 13, wherein
said content-server stores one or more pre-stored clusters, wherein said one or more pre-stored clusters comprise one or more audio fingerprints.

* * * * *